3,475,470
NEW AMINO ACID ESTER COMPLEXES
Mildred C. Rebstock, Ann Arbor, Mich., assignor to Parke, Davis Company, Detroit, Mich., a corporation of Michigan
No Drawing. Filed Oct. 23, 1965, Ser. No. 504,102
Int. Cl. C07c 101/00; A61k 27/00
U.S. Cl. 260—472           5 Claims

ABSTRACT OF THE DISCLOSURE

Complexes of threo-1-p-nitrophenyl-2-dichloroacetamido-3-phenylalanyloxypropan-1-ols with from about 1.20 to about 1.40 formula weights of L-glutamic acid. They are rapidly hydrolyzed to chloramphenicol under physiological conditions and thus exhibit the antibacterial activity of chloramphenicol. However, the complexes containing L-glutamic acid within the indicated range have greatly increased water solubility.

---

The present invention relates to new amino acid ester complexes having the antibacterial activity of chloramphenicol, with increased water solubility and improved pharmaceutical properties. More particularly, the invention relates to new, highly water-soluble complexes of threo-1-p-nitrophenyl - 2 - dichloroacetamido - 3 - phenylalanyloxypropan-1-ol with from about 1.20 to about 1.40 formula weights of L-glutamic acid; and to methods for their production.

The new complexes of the invention can be represented by the structural formula

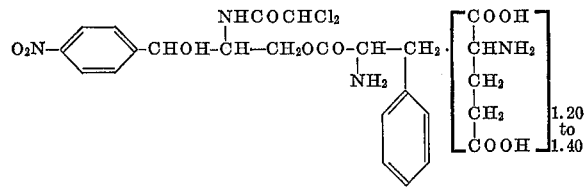

As shown by the foregoing formula, the products of the invention are 1-p-nitrophenyl - 2 - dichloroacetamidopropane-1,3-diol phenylalanine monoester complexes with a quantity of L-glutamic acid approximately 20% to 40% in excess of the equimolar amount.

The complexes corresponding to the foregoing structural formula, as well as the 1-p-nitrophenyl-2-dichloroacetamidropane-1,3-diols and the 1-p-nitrophenyl-2-dichloroacetamido-3-phenylalanyloxypropan-1-ols which can be used as starting materials or intermediates in the practice of the invention, can exist in various isomeric forms. These include stereoisomeric forms which are either racemic or optically active. With respect to the two carbon atoms immediately adjacent to the p-nitrophenyl ring, the present invention is limited to complexes having the threo stereoisomeric form as distinguished from the erythro stereoisomeric form. The groups on the two asymmetric carbon atoms of the threo forms have the same relative spatial configuration or arrangement as the groups on the two asymmetric carbon atoms of pseudoephedrine and threose. As used herein the term "threo" without an accompanying designation of optical form is defined to include DL-threo, corresponding to racemic or DL-threose, and D-threo, corresponding to D-threose. Where a particular optical form is intended the term "threo" is modified as for example, to "D-threo." With respect to the phenylalanine portion of the molecule, the configuration can be the so-called natural configuration (L-phenylalanine), the so-called unnatural configuration (D-phenylalanine), or the DL-form. D-phenylalanine can be converted physiologically to L-phenylalanine and thus both the D- and L-forms as well as the DL-form are acceptable in the compounds of the invention. While glutamic acid can also exist in D-, L-, and DL-forms, the present invention is concerned only with complexes of L-glutamic acid.

Amino acid esters of D-threo-1-p-nitrophenyl-2-dichloroacetamidopropane-1,3-diol (chloramphenicol), as well as of the DL-threo form, well-known in the art as chemical derivatives, are rapidly hydrolyzed to give the antibacterial activity of chloramphenicol. In general, acid-addition salts of the amino acid esters have increased water solubility when compared with the corresponding amino acid ester free bases, and thus the acid-addition salts are of value in preparing aqueous solutions for parenteral administration and in other applications where increased water solubility is desired. In the case of threo-1-p-nitrophenyl-2-dichloroacetamido-3-phenylalanyloxypropan-1-ols, the acid-addition salts with low molecular weight acids also show increased water solubility when compared with the amino acid ester free bases. However, even the acid-addition salts with low molecular weight common acids do not exhibit the degree of water solubility desired in aqueous parenteral solutions. Thus the solubility of D-threo-1-p-nitrophenyl-2-dichloroacetamido-3-L - phenylalanyloxypropan - 1 - ol (chloroamphenicol monoester with L-phenylalanine) free base is less than 0.5 mg./ml. in water, or less than 0.05%. Salts of D-threo-1-p-nitrophenyl-2-dichloroacetamido-3-L-phenylalanyloxypropan-1-ol with common acids such as hydrochloric, sulfuric, citric, and tartaric acids are approximately 20 to 80 times more soluble in water than the free base. However, the average water solubility of most of the salts with common acids is about 2% and thus they would be undesirably dilute if constituted into aqueous solutions for parenteral administration.

It is an object of the present invention to provide threo - 1 - nitrophenyl - 2-dichloroacetamido - 3-phenylalanyl - oxypropan-1 ol complexes of greatly increased water solubility.

In the present invention this object is achieved by providing complexes of threo-1-nitrophenyl-2-dichloro-acetamido-3-phenylalanyloxypropan-1-ol in combination with from about 1.20 to about 1.40 formula weights of L-glutamic acid.

In accordance with the invention, the aforementioned complexes of high water solubility are produced by reacting a threo-1-nitrophenyl-2-dichloroacetamido-3-phenylalanyloxypropan-1-ol with from about 1.20 to about 1.40 formula weights of L-glutamic acid. Some examples of particular starting materials suitable for use in the process of the invention are:

D-threo-1-p-nitrophenyl-2-dichloroacetamido-
  3-L-phenylalanyloxypropan-1-ol
D-threo-1-p-nitrophenyl-2-dichloroacetamido-
  3-D-phenylalanyloxypropan-1-ol
DL-threo-1-p-nitrophenyl-2-dichloroacetamido-
  3-DL-phenylalanyloxypropan-1-ol The process is carried out by reacting the designated quantities of the reactants in a suitable solvent medium. Some suitable solvents for the reaction are lower alkanols, such as methanol, preferably containing a considerable proportion of water. Other solvents can also be used, especially those which are neutral and polar. The time and temperature of the reaction are not critical as the reaction proceeds almost instantaneously at room temperature or below and there is no need to warm the reaction or carry it out over an extended period of time. The product can be isolated by various methods, for example by concentration and lyophilization of the reaction mixture. However, isolation of the product is unnecessary in the practice of the invention. For example the reactants can be dissolved in the proper proportions in a medium which is predominantly aqueous and is suitable for parenteral administration, and the resulting solution containing the L-glutamic acid complex subjected to terminal manufacturing operations such as sterilization and used directly as a parenteral product form.

The threo - 1 - p - nitrophenyl - 2-dichloroacetamido-3-phenylalanyloxypropan-1-ols used as starting materials in the process of the invention can be prepared by any of a variety of methods. For example, by a preferred method, D-threo - 1 - p-nitrophenyl-2-dichloroacetamido-3-L-phenylalanyloxypropan-1-ol is produced by reacting D-threo-1-p-nitrophenyl-2-dichloroacetamidopropane-1,3-diol (chloramphenicol) with L-phenylalanyl chloride hydrochloride. The identical substance, along with the diastereoisomer, is obtained by substituting DL-threo-1-p-nitrophenyl-2-dichloroacetamidopropane-1,3-diol for the chloramphenicol and subjecting the resulting mixture of diastereoisomers to fractional crystallization. Likewise the identical substance, along with a diastereoisomer, is also obtained by reacting chloramphenicol with DL-phenylalanyl chloride hydrochloride and subjecting the resulting mixture of diastereoisomers to fractional crystallization. As illustrated in the examples to follow, starting materials for use in the practice of the invention are also obtained by reacting the D-threo diol with D-phenylalanyl chloride hydrochloride and by reacting the DL-threo diol with DL-phenylalanyl chloride hydrochloride.

The precise chemical nature of the highly water-soluble complexes of the invention is not known with certainty. The ester portion of the complex is a basic substance containing a primary amino group. The L-glutamic acid portion of the complex is an amphoteric substance containing one primary amino group and two carboxyl groups. Thus, the complexes of the invention are considered to result from salt formation between the ester and the glutamic acid, accompanied by an interaction between other amino and carboxyl groups present in the complex.

The complexes of the invention are useful as sources of threo-1-p-nitrophenyl-2 - dichloroacetamido - 3-phenylalanyloxypropan-1-ols having unexpectedly high water solubility. For example, the complex comprising D-threo-1-p-nitrophenyl-2-dichloroacetamido-3-L-phenylalanyloxypropan-1-ol in combination with 1.25 formula weights of L-glutamic acid dissolves very rapidly in water to give an aqueous solution having a concentration (calculated as ester component) greater than 33%. Complexes with 1.20 or 1.375 formula weights of L-glutamic acid have a similar order of solubility. However, with either 1.15 or 1.44 formula weights of L-glutamic acid, the solubility (calculated as ester component) is only about 5%. The corresponding solubility of the acid-addition salt with 1.0 formula weight of L-glutamic acid is less than 1%. By the substitution of 1.25 formula weights of D-glutamic acid, DL-glutamic acid, or L-aspartic acid for the L-glutamic acid, the corresponding solubilities are only approximately 2.5%, 5%, and 1.5% respectively. Thus, the use of L-glutamic acid and the use of the proper proportion are both critical factors in producing the result of the invention. However, when either D-threo-1-p-nitrophenyl-2-dichloroacetamido-3-D-phenylalanyloxypropan-1-ol or DL-threo-1-p-nitrophenyl-2-dichloroacetamido-3-DL-phenylalanyloxypropan-1-ol is substituted for the D-threo-1-p-nitrophenyl-2-dichloroacetamido - 3 - L-phenylalanyloxy-propan-1- ol, a complex with L-glutamic acid of high water solubility is obtained. These complexes dissolve in water to give a concentration (calculated as ester component) greater than 30%. Thus, the stereochemical factor is critical in the glutamic acid component but not in the ester component of the complex.

The solubility behavior of the products obtained with less than about 1.20 formula weights of L-glutamic acid can be described in greater detail. For example, the D-threo - 1 - p-nitrophenyl-2-dichloroacetamido-3-L-phenylalanyloxypropan-1-ol acid-addition salt with 1.0 formula weight L-glutamic acid, or complex with 1.15 formula weights L-glutamic acid, each exhibits what appears to be a high solubility when first mixed with water. However, this apparent high solubility is illusory and of extremely short duration, since within a few minutes D-threo-1-p-nitrophenyl - 2-dichloroacetamido - 3-L-phenylalanyloxypropan-1-ol begins to separate from solution. The solubilities indicated above are the solubilities measured after waiting several minutes to allow the system to reach an equilibrium state.

The complexes of the invention form relatively stable aqueous solutions which are only weakly acidic. Thus, an aqueous solution containing D-threo-1-p-nitrophenyl-2-dichloroacetamido-3-L-phenylalanyloxypropan - 1-ol complex with 1.25 formula weights of L-glutamic acid, at a concentration of 15% ester component, has a pH of 4.65 and remains perfectly clear when it is allowed to stand at room temperature for several hours. In neutral or basic medium or under physiological conditions, the complexes are rapidly hydrolyzed to chloramphenicol. Thus, they can be used in the form of aqueous solutions for parenteral administration. A particular advantage of these solutions is that they are more nearly neutral than solutions prepared from other water-soluble derivatives of chloramphenicol amino acid esters.

The invention is illustrated by the following examples.

EXAMPLE 1

A solution is prepared by dissolving 100 mg. of D-threo - 1-p-nitrophenyl-2-dichloroacetamido-3-L-phenylalanyloxypropan-1-ol in 3 ml. of methanol. To this solution is added 39.1 mg. (a 25% excess over the equimolar amount) of L-glutamic acid in 5 ml. of water. The methanol is removed by distillation under reduced pressure and the remaining aqueous solution is frozen and lyophilized. The D-threo-1-p-nitrophenyl-2-dichloroacetamido - 3-L-phenylalanyloxypropan-1-ol complex with 1.25 formula weights of L-glutamic acid is obtained as a white, fluffy powder. It is highly soluble in water.

By the foregoing procedure, but using 37.6 mg. or 43.0 mg. of L-glutamic acid, there are obtained respectively, the D - threo - 1-p-nitrophenyl-2-dichloroacetamido-3-L-phenylalanyloxypropan-1-ol complex with 1.20 formula weights of L-glutamic acid and with 1.375 formula weights of L-glutamic acid. Both of these products are highly water-soluble.

The starting material can be obtained as follows. Phosphorus pentachloride, 8 g., is stirred for 30 minutes with 225 ml. of carbon tetrachloride in order to dissolve as much of the phosphorus pentachloride as possible. L-phenlalanine, 6 g., is then added and the reaction mixture is stirred for 24 hours at 25° C. with protection from atmospheric moisture. The insoluble product which separates is collected on a sintered glass filter, washed with carbon tetrachloride and with petroleum ether, and dried in vacuo at room temperature. This product is L-phenylalanyl chloride hydrochloride. It is suitable for use without further purification and should be used as soon as possible as it undergoes hydrolysis on exposure to atmospheric moisture.

With stirring and with protection from atmospheric moisture, 6 g., of L-phenylalanyl chloride hydrochloride is added to a solution of 7 g. of chloramphenicol in 170 ml. of purified ethyl acetate. The reaction mixture is stirred for 24 hours at 25° C. and the insoluble reaction product is collected by centrifugation and washed 3 times by suspending in petroleum ether and recentrifuging. The last suspension in petroleum ether is filtered and the solid product dried in vascuo at room temperature. This solid product is a white crystalline powder consisting of crude D-threo - 1-p-nitro-phenyl-2-dichloroacetamido-3-L-phenylalanyloxypropan-1-ol hydrochloride containing small amounts of chloramphenicol and L-phenylalanine. For purification, 8.57 g. of the crude hydrochloride as obtained is dissolved in 200 ml. of ice water and the resulting solution (pH 2.3) is extracted twice with 170 ml. portions of cold ether. About 440 mg. of chloramphenicol is removed in the ether extract. The aqueous solution is adjusted to pH 7.8 by the addition of solid sodium bicarbonate (about 3.4 g.) at 0–5° C. and extracted 4 times, each time with an equal volume of ethyl acetate. The ethyl acetate extracts are combined and evaporated to give a residue of D-threo-1-p-nitrophenyl-2-dichloroacetamido-3-L-phenylalanyloxypropan-1-ol; following crystallization from 20 ml. of ethylene dichloride, 4.16 g. of product is recovered, M.P. 124–126° C. An additional quantity of the same product can be obtained from the ethyl acetate liquors from the original reaction mixture. If further purification is desired, analytically pure D-threo - 1-p-nitrophenyl-2-dichloroacetamido-3-L-phenylalanyloxypropan-1-ol is obtained by dissolving the product in ethyl acetate at room temperature and crystallizing the product by refrigeration; M.P. 131–132° C.; $[\alpha]_D^{25} = +32°$ (4.01% in methanol).

EXAMPLE 2

A solution of 39.1 mg. (a 25% excess over the equimolar amount) of L-glutamic acid in 8 ml. of water is added to a solution of 100 mg. of DL-threo-1-p-nitrophenyl - 2 - dichloroacetamido - 3 - DL - phenylalanyloxypropan-1-ol in 3 ml. of methanol. The methanol is removed by distillation under reduced pressure and the remaining aqueous solution is frozen and lyophilized. The DL-threo-1-p-nitrophenyl-2-dichloroacetamido-3-DL-phenylalanyloxypropan-1-ol complex with 1.25 formula weights of L-glutamic acid is obtained as a white powder having high solubility in water.

In the foregoing procedure, by the substitution of an equal weight of D-threo-1-p-nitrophenyl-2-dichloroacetamido-3-D-phenylalanyloxypropan - 1 - ol for the DL-threo - 1 - p - nitrophenyl - 2 - dichloroacetamido - 3 - DL-phenylalanyloxy-propan-1-ol, the product obtained is the highly water-soluble O-threo-1-p-nitrophenyl-2-dichloroacetamido-3-D-phenylalanyloxypropan-1-ol complex with 1.25 formula weights of L-glutamic acid.

The starting materials can be obtained as follows. DL-phenylalanyl chloride hydrochloride is prepared by reacting DL-phenylalanine with phosphorus pentachloride. D-phenylalanyl chloride hydrochloride is prepared by reacting D-phenylalanine with phosphorus pentachloride. In each case the general procedure is as given above for the preparation of L-phenylalanyl chloride hydrochloride.

With stirring and with protection from atmospheric moisture, 6.2 g. of freshly-prepared DL-phenylalanyl hydrochloride is added to a solution of 7 g. of DL-threo-1 - p - nitrophenyl - 2 - dichloroacetamidropropane - 1, 3-diol in 200 ml. of ethyl acetate. The reaction mixture is stirred at room temperature for 20 hours and filtered to give an insoluble fraction of 4.95 g. and a soluble fraction (obtained by evaporation of the ethyl acetate filtrate) of 8.6 g. The fractions are dissolved respectively in 50 ml. and in 100 ml. of cold water and each solution is washed twice with ether to remove unreacted starting material, adjusted to pH 8 with solid sodium bicarbonate, and extracted 4 times with ethyl acetate. Evaporation of the ethyl acetate extracts gives a residue of crude DL - threo - 1 - p - nitrophenyl - 2 - dichloroacetamido-3-DL-phenylalanyloxypropan-1-ol. For purification this free base can be crystallized directly; or it can be converted to the methanesulfonate salt (M.P. 194–195° C.) and the free base regenerated with sodium bicarbonate and crystallized from a mixture of ethyl acetate, ether, and petroleum ether. The M.P. of the free base is 104–105° C. with a prior transition point at 72–75° C.

With stirring and with protection from atmospheric mostiure, 6 g. of freshly-prepared D-phenylalanyl chloride hydrochloride is added to a solution of 7 g. of D-threo - 1 - p - nitrophenyl - 2 - dichloroacetamidopropane-1,3-diol (chloramphenicol) in 170 ml. of ethyl acetate. The reaction mixture is stirred at room temperature for 18 hours and centrifuged to give 3.1 g. of solid product, and a filtrate from which 10.2 g. of product is recovered by evaporation of the ethyl acetate. The fractions are dissolved respectively in 35 ml. and in 110 ml. of cold water and each solution is washed twice with ether to remove unreacted chloramphenicol, adjusted to pH 8 with solid sodium bicarbonate, and extracted 4 times with ethyl acetate. Evaporation of the ethyl acetate extracts gives a residue of crude D-threo-1-p-nitrophenyl-2-dichloroacetamido-3-D-phenylalanyloxypropan-1-ol. The preferred method of purification is by converting the free base to the methanesulfonate salt (M.P. 215–216° C.) and regenerating the free base with sodium bicarbonate. The free base has $[\alpha]_D^{25} = +29°$ (3.34% in ethanol).

I claim:
1. A complex of high water solubility consisting of threo - 1 - p - nitrophenyl - 2 - dichloroacetamido - 3-phenylalanyl-oxypropan-1-ol in combination with from about 1.20 to about 1.40 formula weights of L-glutamic acid.

2. A product as defined in claim 1, wherein the threo-1 - p - nitrophenyl - 2 - dichloroacetamido - 3 - phenylalanyloxypropan-1-ol is D-threo-1-p-nitrophenyl-2-dichloroacetamido-3-L-phenylalanyloxpropan-1-ol.

3. A product as defined in claim 1, wherein the threo-1 - p nitrophenyl - 2 - dichloroacetamido - 3 - phenylalanyloxypropan-1-ol is D-threo-1-p-nitrophenyl-2-dichloroacetamido-3-D-phenylalanyloxypropan-1-ol.

4. A product as defined in claim 1, wherein the threo-1 - p - nitrophenyl - 2 - dichloroacetamido - 3 - phenylalanyloxypropan-1-ol is DL-threo-1-p-nitrophenyl-2-dichloroacetamido-3-DL-phenylalanyloxypropan-1-ol.

5. A complex of high water solubility consisting of D - threo - 1 - p - nitrophenyl - 2 - dichloroacetamido-3-L-phenylalanyloxypropan-1-ol in combination with about 1.25 formula weights of L-glutamic acid.

References Cited

UNITED STATES PATENTS 3,190,910  6/1965  Nocalaides _____ 260—472

LORRAINE A. WEINBERGER, Primary Examiner

L. A. THAXTON, Assistant Examiner

U.S. Cl. X.R.

260—999